United States Patent [19]

Brudevold

[11] 4,094,000
[45] June 6, 1978

[54] GRAPHICS DISPLAY UNIT

[75] Inventor: Finn Brudevold, Wellesley, Mass.

[73] Assignee: Atex, Incorporated, Bedford, Mass.

[21] Appl. No.: 751,138

[22] Filed: Dec. 16, 1976

[51] Int. Cl.² ............................................. G06F 3/14
[52] U.S. Cl. ............................... 364/900; 340/324 AD
[58] Field of Search ... 364/200 MS File, 900 MS File; 340/324 R, 324 AD, 324 M, 146.3 MA; 358/78, 903, 103

[56] References Cited

U.S. PATENT DOCUMENTS

| | | | |
|---|---|---|---|
| 3,634,828 | 1/1972 | Myers et al. | 340/172.5 |
| 3,895,357 | 7/1975 | Schwartz et al. | 340/172.5 |
| 3,905,018 | 9/1975 | Gray | 340/172.5 |
| 3,909,792 | 9/1975 | Harris et al. | 340/172.5 |
| 3,911,404 | 10/1975 | O'Neill | 340/172.5 |
| 3,955,189 | 5/1976 | Thomson | 340/324 AD |
| 4,009,335 | 2/1977 | Payne et al. | 340/324 M X |

Primary Examiner—Mark E. Nusbaum
Attorney, Agent, or Firm—Cesari and McKenna

[57] ABSTRACT

A display unit useful for displaying graphical information and specifically for composing items to be printed on a page. The display unit includes a dot matrix screen and a display memory for storing the information to be displayed. An addressing register identifies memory locations in a sequence starting at location established by a begin display register. The starting location is transferred to the addressing register each time the display unit reaches a first dot location in the display unit. If the starting location is changed, an image corresponding to the item stored in the memory moves on the screen as a unit. Two or more memories can be interconnected to enable a relative motion between images corresponding to the items stored in each display memory.

15 Claims, 7 Drawing Figures

GRAPHICS DISPLAY UNIT

CROSS-REFERENCES TO RELATED APPLICATIONS

1. U.S. patent application Ser. No. 717,000 filed Aug. 23, 1976 now U.S. Pat. No. 4,057,849 issued Nov. 8, 1977 for a Text Editing and Display System which is assigned to the same assignee as this invention and which is a continuation of U.S. patent application Ser. No. 508,359 filed Sept. 23, 1974 (now abandoned).

2. U.S. patent application Ser. No. 710,220 filed July 30, 1976 for a Text Editing Display System Having Grouped Displays which is assigned to the same assignee as this invention and which is a continuation of U.S. patent application Ser. No. 508,358 filed Sept. 23, 1974 (now abandoned).

3. U.S. patent application Ser. No. 553,750 filed Feb. 25, 1975 for a Text Editing and Display System Having Text Insert Capability which is assigned to the same assignee as this invention and which now is U.S. Pat. No. 3,980,994 issued Sept. 14, 1976.

BACKGROUND OF THE INVENTION

This invention generally relates to a computer-controlled graphics display apparatus and more specifically to such graphics display apparatus that is useful for printing various publications including newspapers and magazines.

These publications characteristically contain textual material, pictures with captions, and advertisements. A combination of one or more of these items are arranged on one or more pages. The format of the foregoing items on each page must conform to various constraints. These contraints include column width, type fonts, point sizes and the number of lines on a page. Moreover, in its final form, a page must be esthetically pleasing. Satisfying all these constraints is a difficult task. Therefore, conventional page composition is a complex and time-consuming task.

In accordance with one such conventional approach for composing a page, the items are individually set in type. Proofs are then printed for editing purposes. After the editing is completed, a page is composed by "cutting and pasting" to form different pages of the publication. After this step, the type used to obtain the clean proofs is rearranged to provide a "galley" for the entire page. Alternatively, the "galley" might comprise the clean proofs that have been arranged on the page.

In either case the arrangement of the items on the page is reviewed to determine whether the page complies with all the various constraints. If it does, the page is ready to be printed by means of full-page typeset plates or by means of photographic plates obtained by photographing the galleys. If, on the other hand, the page does not comply with the various constraints, all the foregoing steps must be performed again until the constraints are satisfied. Such a procedure may require resetting type or printing additional clean proofs.

These procedures for composing items on the pages of a publication have varied little even with the advent of photocomposition machines and the use of such machines in association with text editing systems, such as described in the aforementioned U.S. Pat. No. 4,057,049 and U.S. patent application Ser. No. 710,220. While these systems eliminate the typesetting steps described in the prior paragraph, they do not significantly alter the steps for composing a page. In such a system, the various items are individually corrected and proofread by means of electronic display devices thereby to eliminate the necessity for the proofs used during the editing process. Once the editing is completed, however, an operator must enter various printing information to control the outline and other features of the item. A photocomposition machine receives all this information from the text editing system and prints the various items in accordance with the several constraints for each. These printed items are then cut and pasted in preparation for the production of a photographic printing plate. Thus, even with this procedure the operator never sees the actual format until the page is printed.

It is apparent that even today the procedures for composing textual material, pictures, advertisements and other items into an esthetically pleasing page have not changed significantly, even though these procedures are complex and require many manual steps. Moreover, the complexity further increases if the first attempt at composing a page is not satisfactory, because all the many steps that were taken may have to be performed again.

Therefore, it is an object of this invention to provide apparatus that reduces the complexity of page composition.

Another object of this invention is to provide apparatus that can be used to compose pages electronically without the need for any galley, or other intermediate, proofs.

Still another object of this invention is to provide apparatus that electronically simulates a page and enables the textual material, advertisements, picture outlines and other items to be moved on the page during the composition process.

SUMMARY

In accordance with this invention, the foregoing objects are realized by means of a graphics display unit that provides a visual display of an image on a screen with the image being a representation of input data. The screen is defined by a single dot matrix in which individual dots are selected for energization in a predetermined sequence. Information for controlling the energization of each dot in the matrix is stored in addressable locations in a memory that is associated with the display unit, the input data being stored in a portion or subset of the available addressable locations in the memory. An initial correspondence between one storage location and a reference display position is established; and a relative correspondence between successive storage positions in the matrix and the addressing of successive storage locations in the memory thereafter is maintained. If the initial correspondence is varied, the image on the screen "moves" as a unit to a new location.

It also is possible to couple the dot energizing information that is stored in separate memories to a single screen. In this embodiment, separate initial correspondences are established between a given reference display position on the one hand, and a storage location in each memory on the other hand. If an initial correspondence between one memory and the reference display position is maintained while the other correspondence is varied, then the image corresponding to input data that is "stored" in the second memory will "move" with respect to the image corresponding to other input data that is "stored" in the first memory.

This invention is pointed out with particularity in the appended claims. The above and further objects and advantages of the invention may be better understood by referring to the following description taken in consideration with the accompanying drawings.

BRIEF DESCRIPTION OF THE DRAWINGS

FIG. 6 is a detailed schematic diagram of another portion of the timing and control unit that is shown in FIG. 2 while

DESCRIPTION OF AN ILLUSTRATIVE EMBODIMENT

Figure 1:
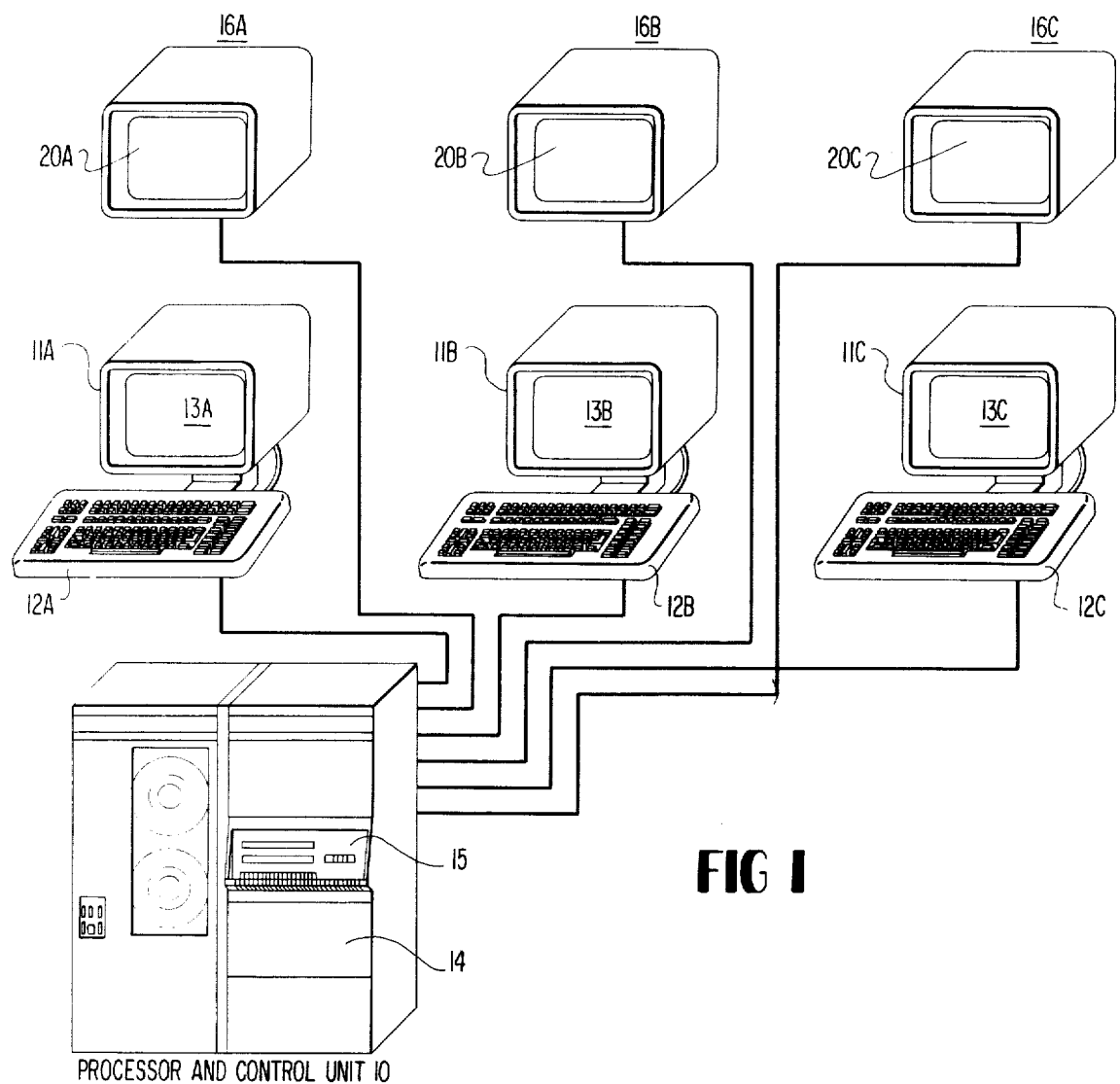
FIG. 1 depicts a system that includes composition stations that are constructed in accordance with this invention.

FIG. 1 depicts a text editing system that contains composition stations constructed in accordance with this invention. A processor and control unit 10 interacts with text editing stations 11A, 11B and 11C that comprise input keyboards 12A, 12B and 12C and display screens 13A, 13B and 13C. Although three such text editing stations are shown, a text editing system may comprise one or more such stations. The operation of a text editing station 11 and the processor and control unit 10 is described in the previously identified U.S. patents and patent application. It is sufficient for an understanding of this invention to state that the text of an item initially is entered into the system by means of an input keyboard (e.g., 12A) and is displayed visually on a display screen (e.g. 13A) or equivalent display device. Once an article is edited completely, printing information including information about column width, type size and type fonts is entered into the system. In the system is shown in FIG. 1, this information is stored in a memory section 14 by a central processor 15 located in the unit 10. The memory section 14 may comprise random access memory units, direct access memory units or both.

Three composition stations 16A, 16B and 16C are shown in FIG. 1. The screen in each visual display device 20A, 20B and 20C at the respective composition stations 16A, 16B and 16C may be thought of as a single dot matrix display. When a page is to be composed, the operator uses the input keyboard of a corresponding text editing station to identify and retrieve an article or other item from the memory section 14. The system uses the printing information and text from the edited item to produce a "scaled-down" version that, in a "black-and-white" display, is represented by a series of binary digits. Each binary digit, or "bit", corresponds to one position on the dot-matrix, and this information is stored in a dot-matrix display memory associated with the composition station. The composition station displays the item after the corresponding information is stored in the display memory.

In another embodiment, which requires two display memories, input data representing two images are stored separately in the first and second display memories. The display information from these separate memories then is combined in a logical function. More specifically, bits corresponding to an item to be entered for display purposes are stored in a first memory. Control information that positions the item on the page then is entered through a corresponding one of the keyboards 12. Once the item is properly positioned, the information in the first display memory is transferred to the second display memory. Then another item can be composed on the screen by transferring the relevant input data to the first display memory. The signals derived from each display memory are synchronized and combined to produce a double image in the screen. This arrangement allows the image corresponding to the input data stored in the first memory to be positioned anywhere on the page to include superpositioning the image over previously positioned images without any loss in control of the display.

When images corresponding to all the input data are properly positioned on a page, the control information establishes the format of that page corresponding to the proper instructions and data for the photocomposition machines. Thus, in accordance with this invention, the first proof is "camera-ready". The requirements for the printing of intermediate proofs, and especially the galley proofs, are eliminated. The foregoing system thereby minimizes the work that is necessary to compose a page because the complexity of the page composition procedures is reduced significantly through the electronic page simulation that this invention provides.

Figure 2:
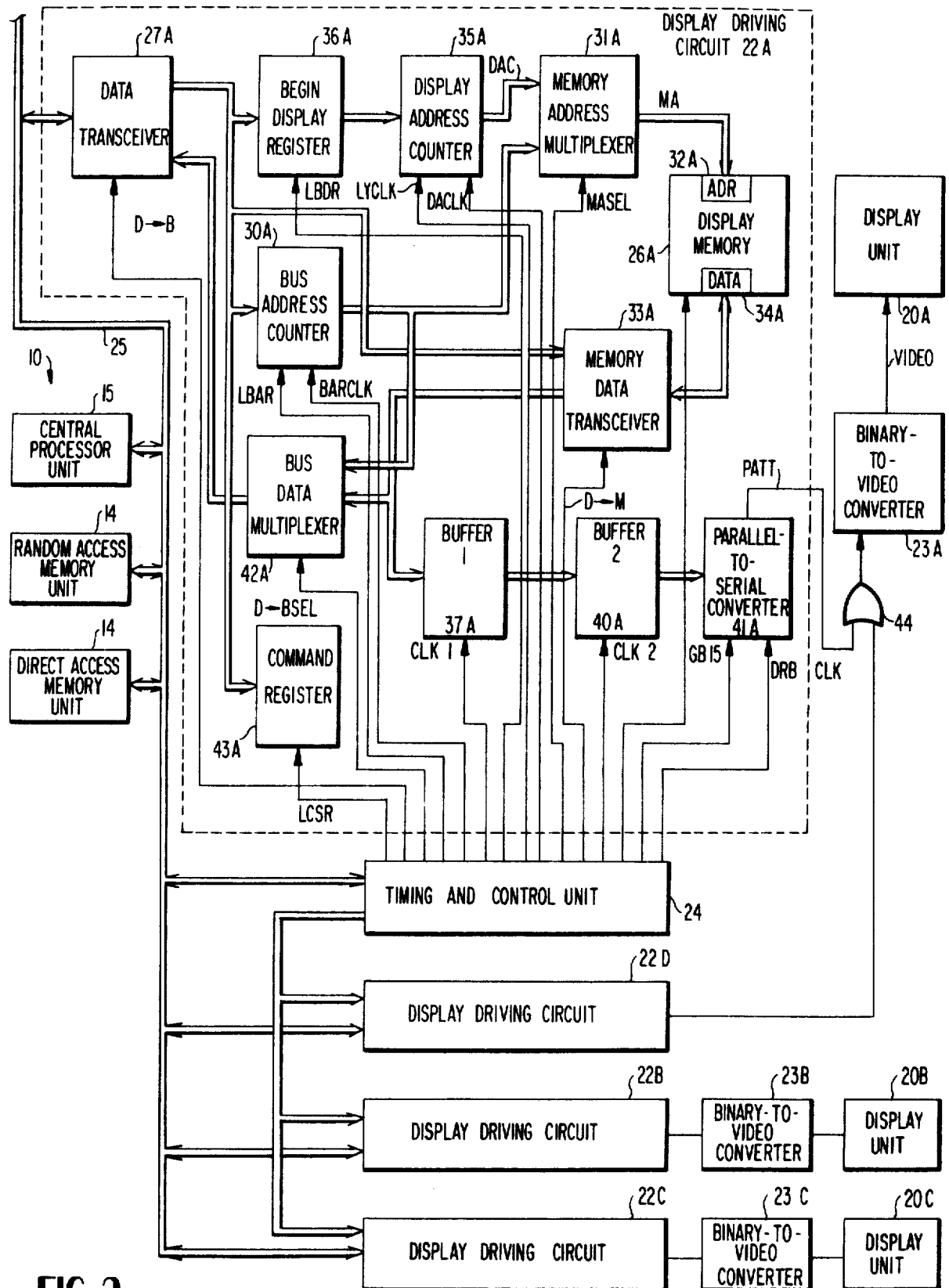
FIG. 2 is a schematic diagram, in block form, of the circuitry associated with each composition station shown in FIG. 1.

Now referring to FIG. 2, a composition station constructed in accordance with this invention includes a display unit, connected to a corresponding display driving unit and a binary-to-video converter. For example, a display unit 20B responds to circuitry including a display driving circuit 22B and a binary-to-video converter 23B. In this specific embodiment, a single timing and control unit 24 generates a sequence of timing and control signals that are conveyed to each of the display driving circuits 22A, 22B, 22C and 22D. The display unit 20A through 20D shown in FIG. 1 therefore operate in timed synchronism, although each display may present different information to different users. As each display driving circuit contains identical circuitry only the display driving circuit 22A is shown in detail.

Three basic operating modes characterize the operation of the composition stations shown in FIG. 2. One such operating mode is a "writing mode" during which data representing an item that is to be displayed is transferred from the processor and control unit 10 over a bus 25 to a display memory, a display memory 26A being associated with the display driving circuit 22A. In the writing mode, a data transceiver 27A first receives data corresponding to a memory address from the bus 25. The timing and control unit 24 then establishes a writing cycle during which an LBAR signal causes a bus address counter 30A to store the data that constitutes the address. An MASEL signal establishes a path from the counter 30A through a memory address multiplexer 31A to a memory address port 32A in the display memory 26A.

Data on the bus 25, containing dot-illuminating information in each bit position, can be transferred as a data word through the data transceiver 27A and a memory data transceiver 33A to a data port 34A in the display memory 26A. As the processor and control unit 10 transfer a succession of data words to the circuit 22A, they are loaded into successive memory locations identified by the counter 30A in response to an incrementing signal or a transfer from the bus 25 as described later. In this manner data is loaded into the display memory 26A, normally into a portion of the available locations in that display memory.

The second basic operating mode is a "refresh reading mode". The display unit 20A normally comprises a cathode ray tube as a display device. As known, it is necessary to energize such a device in an iterative fashion in order to maintain a persistent visual display. Therefore, all the words in the display memory 26A must be continuously and repeatedly routed to the display 20A during a succession of iterations. During such a refresh reading mode, DACLK signals from the timing and control unit 24 constantly change the value in a display address counter 35A. The counter 35A effectively has a modulus that corresponds to the number of dot positions in the matrix divided by the number of bit positions in a "word" as that term is used in connection with the processor and control unit 10. Its initial value is established by a begin display register 36A. An LYCLK signal causes the value in the register 36A to be transferred to the counter 35A. Each successive address then is coupled through the memory address multiplexer 31A to the memory address port 32A. Each time an address is received, the display memory 26A retrieves the corresponding data word and presents it at the data port 34A. This data then is coupled through the memory data transceiver 33A, the buffers 37A and 40A and a parallel-to-serial converter 41A. The binary bits, in series, are coupled to the binary-to-video converter 23A therein to be transformed into video signals for the display unit 20A.

A "reading mode" of operation is used to transfer data from a display memory to a direct access memory device or other similar device to "store" the image or to transfer data from one display memory to another. It also is used to ascertain the nature of specific operations of a composition station and enables diagnostic routines in the processor and control unit 10 to retrieve relevant information from the memory 26A and the bus address counter 30A. The memory address multiplexer 31A couples an address supplied during this reading mode to the memory address port 32A. Data from the designated storage location is conveyed from the data port 34A to the bus 25 through the memory data transceiver 33A and a bus data multiplexer 42A.

The system assumes one of the foregoing reading or writing operating modes in response to a reading or writing cycle initiated by the central processor and control unit 10.

One of the writing operations involves a transfer to a command register 43A via the data transceiver 27A. The register 43A is loaded in response to an LCSR signal from the timing and control unit 24 and is useful to determine whether the screen will be blanked or whether address counters will be incremented automatically.

Thus, a composition station constructed in accordance with this invention includes a display and a display driving circuit for controlling the image presented by the display. Such a station enables a person to compose electronically items on a page. The location of each of the items can be varied horizontally and vertically to a final position merely by changing the contents of the begin display register 36A.

As previously stated, two, or even more, display driving circuits can be interconnected to control a single display. In FIG. 2, the single binary-to-video converter 23A receives binary output signals from the display driving circuits 22A and 22D through an OR gate 44 that logically combines the signals in an inclusive OR operation. If a begin display register in the circuit 22D is set to ZERO, the first data bit from the parallel-to-serial converter in the display driving circuit 22D constitutes a signal that can control the illumination of the upper left-hand dot in the display 20A, this dot constituting a reference display position. As both display driving circuits are energized in synchronism during the refresh reading mode, any item in the display memory 26A will be displayed at an initial position that is dependent upon the value in the begin display register 36A. If both register 36A and the corresponding register in the circuit 22D contain the same number and the two items are stored in corresponding storage locations, the two images from those duplexed memories will be superimposed.

If the number in the begin display register 36A is then altered, the image corresponding to any item stored in the display memory 26A will be displayed as a unit without any change in its general appearance. Once an item is properly positioned, an entry is made via an input keyboard to cause the processor and control unit 10 to transfer the data in the display memory 26A to corresponding locations in the display memory in the display driving circuit 22D that are defined by the contents of the begin display register 36A. Then a next item to be added to the page can be transferred to the display driving unit 22A from the processor and control unit 10. If a page that is being composed does not satisfy the various constraints, it is a simple matter to clear the display, or change any printing information and then compose the page again using both the display driving units 22A and 22D. Thus, it is a relatively easy task to change the position of an item on the display device in either of the foregoing embodiments merely by altering the value in the begin display register 36A. For example, if the resolution of the screen is to be 72 dots per inch, an 8-inch screen will contain 576 bits position in each row. Incrementing or decrementing the counter 36A by "1" to "36" causes the image to shift horizontally as a unit. If the contents of the register 36A are altered by a factor of 36$n$, the image undergoes a vertical displacement of $n$ rows of the matrix.

The foregoing structure minimizes the number of operations that the processor and control unit 10 must perform. Moreover, the complex intermediate steps involving typesetting or photocomposition steps and the cutting and pasting steps thereby are eliminated.

Figure 3:
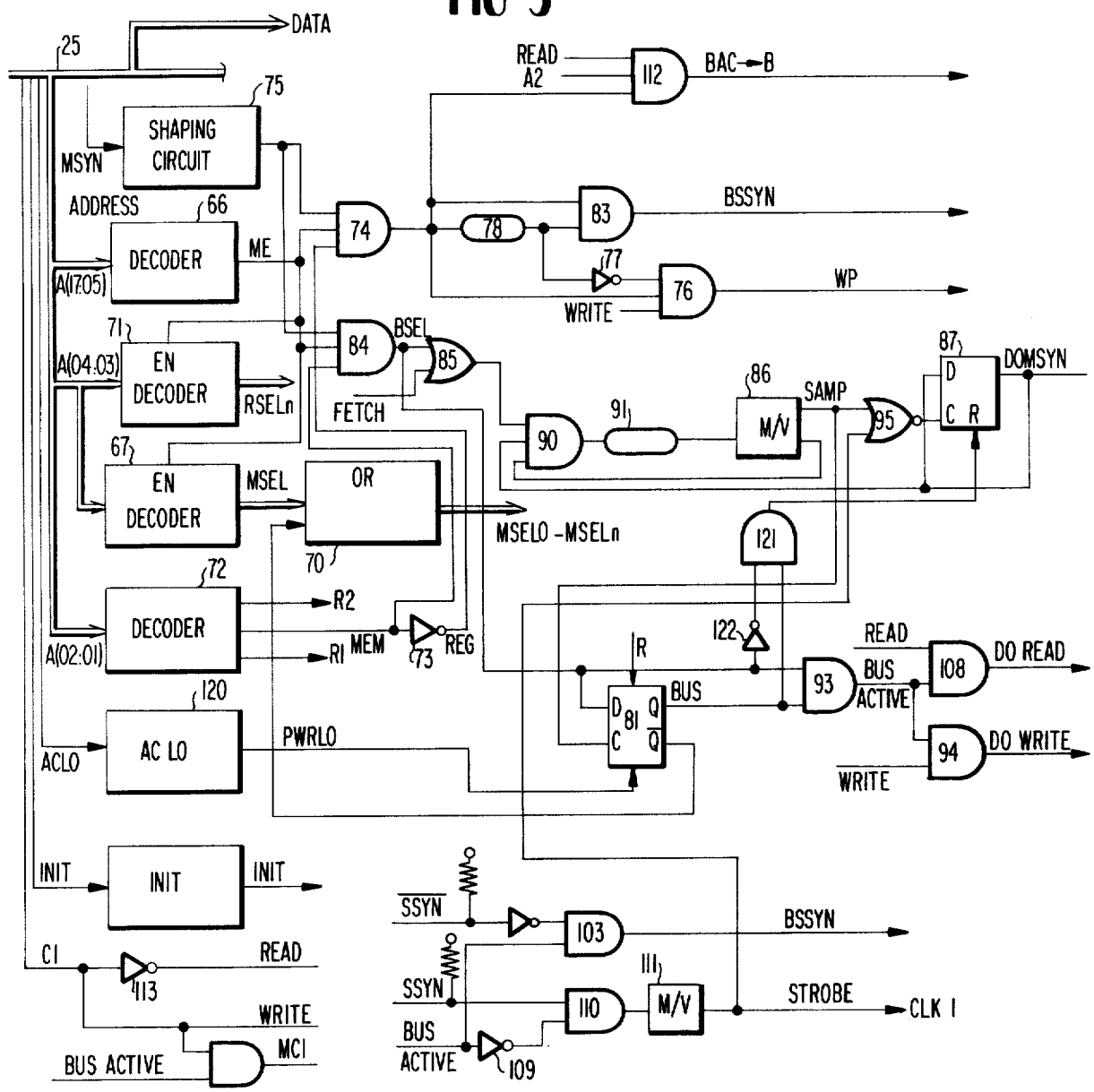
FIG. 3 is a detailed schematic diagram of a portion of one embodiment of a timing and control unit that is depicted in FIG. 2.

FIG. 3 discloses a specific embodiment of a portion of a timing and control unit 24 that responds to signals from the processor and control unit 10 in FIG. 1. This circuitry also arbitrates between requests for access to a display memory from the corresponding display driving control circuit for refreshing purposes and from the central processor unit 14 for reading or writing purposes. For purposes of this discussion, it is assumed that each display, such as display unit 20A, comprises a raster-type CRT unit that presents the 30 frames per second and interlaces the display with 515 lines, or scans, per frame. Moreover, it is assumed that the horizontal density of the dots corresponds to point size (i.e., 72 dots per inch) and that the display has a horizontal dimension of eight inches. The electron beam is moved from dot to dot in a predetermined sequence thereby to selectively energize dots depending upon the state of the VIDEO signal. It is also assumed that the processor and control unit 10 comprises a PDP11 data processing system that is characterized by processing "words" having 16 bit positions and by effecting data transfers between devices connected to a common bus by establishing a "master-slave" relationship wherein a master device controls a transfer of data to or from a slave device that the master device designates. In the specific embodiment, each display driving unit operates only as a "slave" unit while an input keyboard would operate either as a "master" unit or a "slave" unit under the appropriate circumstances.

During a typical operation, an operator enters information into the system through his input keyboard to start processing instructions in a composition display routine. This routine causes the processor and control unit 10, as a master device, to transfer control information to specified locations in the display driving unit, such as the begin display register 36A in FIG. 2.

Writing Mode

Now considering each of the three operating modes separately, during the writing mode it is possible to alter the contents of the begin display register 36A, of the bus address counter 30A, of the command register 43A and/or of a data buffer that corresponds to a location in the display memory 26A identified by the counter 30A. In the environment of a PDP11 data processing system, the processor unit 15 effects such a transfer by placing the data that is to be written into the designated register on data conductors in the bus 25, an address on address conductors to designate a specific register and a direction control signal (C1) on a corresponding control conductor.

Whenever high-order bits of the address signals correspond to any of the registers in any of the display driving circuits connected to the timing and control unit 24, a decoder 66 in the unit 24, and shown in FIG. 3, generates an ME signal. The ME signal allows another decoder 67 to decode two additional bits of the address thereby to identify one of the four display driving circuits by generating a corresponding MSEL signal. An OR gate network 70 responds to these signals by producing one MSEL signal if a BUS signal is asserted or all the MSEL signals if the BUS signal is not asserted, as described later. A decoder 71 transmits an RSELn signal that corresponds to the identified display driving circuit. Still another decoder 72 transmits R1 and R2 signals in response to other address signals to identify one of the foregoing registers. Whenever the data buffer register (i.e., a "fictitious" register that represents the data port 34A in the display memory 26A is addressed), the decoder 72 transmits an MEM signal. When one of the other registers is addressed, an inverter 73 transmits an REG signal.

In the context of a writing operation during which data is transferred to one of the registers 30A, 36A or 43A, the REG signal from the inverter 73 is asserted and, with the ME signal from the decoder 66, enables an AND gate 74. When an MSYN signal, transmitted by the central processor unit 15 in FIG. 1, is received, it passes through a shaping circuit 75 and energizes the AND gate 74. As the C1 direction control signal from the bus 25 is asserted, it produces a WRITE signal. An AND gate 76 also is energized because inverter 77 connected to the output of a delay circuit 78 also enables the AND gate 76. After the delay determined by the delay circuit 78, the inverter 77 disables the AND gate 76. Thus, this circuitry generates a fixed width WP pulse that is triggered during a writing operation when the MSYN pulse shifts to an asserted state.

Figure 4:
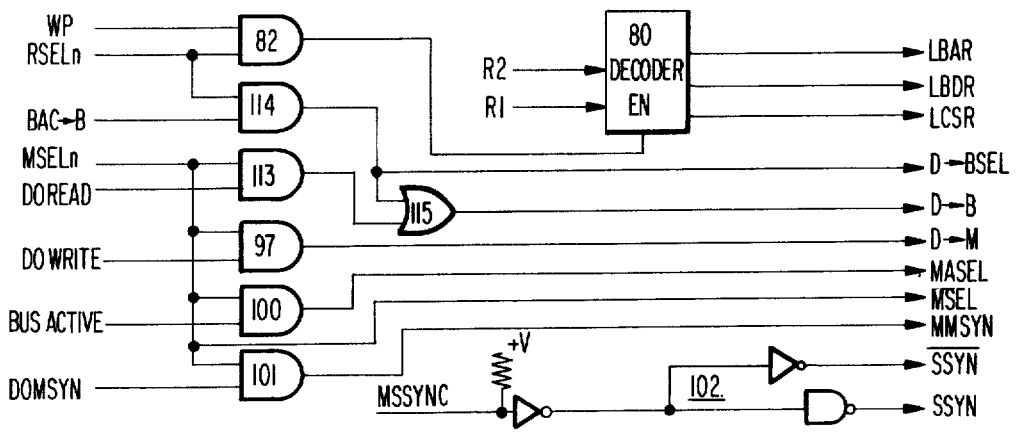
FIG. 4 is a detailed schematic diagram of a portion of a display driving unit in FIG. 2 that responds to signals from the timing and control unit shown in FIG. 3.

The R1 and R2 signals from the decoder 72 are applied to a decoder 80 shown in FIG. 4. FIG. 4 represents additional decoding circuitry that is associated with each of the display driving circuits. During the foregoing writing operation a flip-flop 81 in FIG. 3 is cleared, so the OR gate network 70 causes all the MSELn signals to be asserted simultaneously. However, only the RSELn signal that corresponds to display driving circuit identified by the address signals is asserted. Thus, only an AND gate 82 in FIG. 4 is energized thereby to enable the decoder 80 to transmit an LBAR, an LBDR or an LCSR pulse that is coterminous with the WP pulse. Thus, the data on the bus 25 is loaded into the register that is clocked by the one output from the decoder 80.

During any writing operation to one of these three registers, the delay circuit 78 in FIG. 3 energizes an AND gate 83 simultaneously with the trailing edge of the WP pulse and produces a BSSYN signal that is coupled back to the central processor unit 15 as a slave synchronizing signal. This signal indicates that the writing operation to the selected register has been completed and enables the central processor unit 15 to terminate the MSYN signal thereby to disable the AND gate 74 and complete the transfer operation.

When it is desired to write data into the display memory 26, the address for an initial storage location is loaded into the bus address counter 30A in accordance with the foregoing writing operation. However, when data to be stored in the display memory 26A is transmitted, the address signals designate the ficticious data buffer register to establish a data path from the bus 25 to the data port 34A in FIG. 2. During this writing operation, the decoder 72 in FIG. 3 transmits the MEM signal so an AND gate 84 generates a BSEL signal when the MSYN signal is received. The BSEL signal conditions the flip-flop 81 to be set by a SAMP signal and energizes an OR gate 85. When the flip-flop 81 is set, only the MSELn signal that corresponds to the display driving circuit identified by the address signals is transmitted. This circuitry acts as an arbiter. If there are simultaneous requests for a read-refresh cycle (made when a FETCH signal is active) and for a bus writing operation, OR gate 85 is energized to indicate some sort of request is present. However, the AND gate 84 conditions the flip-flop 81 to be set and this selects the bus request over the read-refresh request.

Assuming that a one-shot monstable multivibrator 86 and a flip-flop 87 are cleared, an AND gate 90 is energized and, after an interval established by a delay circuit 91, triggers the one-shot monostable multivibrator 86 to generate the SAMP pulse. The leading edge of the SAMP pulse clocks the flip-flop 81 to establish a response to the bus request and energizes an AND gate 93 that transmits a BUS ACTIVE signal. During a writing operation to a display memory, the WRITE signal and BUS ACTIVE signal energize an AND gate 94 thereby to transmit a DOWRITE signal. On the trailing edge of the SAMP pulse, a NOR gate 95 sets the flip-flop 87 to transmit a DOMSYN signal.

Now referring to FIG. 4, the MSELn and DO-WRITE signals energize an AND gate 97. The resultant D→M signal conditions the memory data transceiver 33A in FIG. 2 to couple data to the data port 34A in the display memory 26A from the bus data multiplexer 42A. Simultaneously, the MSELn and the BUS ACTIVE signals energize an AND gate 100 to generate the MASEL signal that conditions the memory address multiplexer 31A to couple the signals from the bus address counter 30A to the memory address port 32A. The MSELn and the delayed DOMSYN signals from the flip-flop 87 in FIG. 3 then energize an AND gate 101 in FIG. 4 to transmit an MMSYN signal that effects a writing operation in the display memory. Once the memory "writes" the information, it generates an MSSYNC signal that causes a circuit 102 to produce SSYN and $\overline{\text{SSYN}}$ signals. Referring again to FIG. 3 the $\overline{\text{SSYN}}$ signal energizes an AND gate 103, enabled by the BUS ACTIVE signal, thereby to transmit a BSSYN signal back to the central processor 15 signalling the end of the writing operation and enabling the termination of the MSYN signal.

Figure 5:
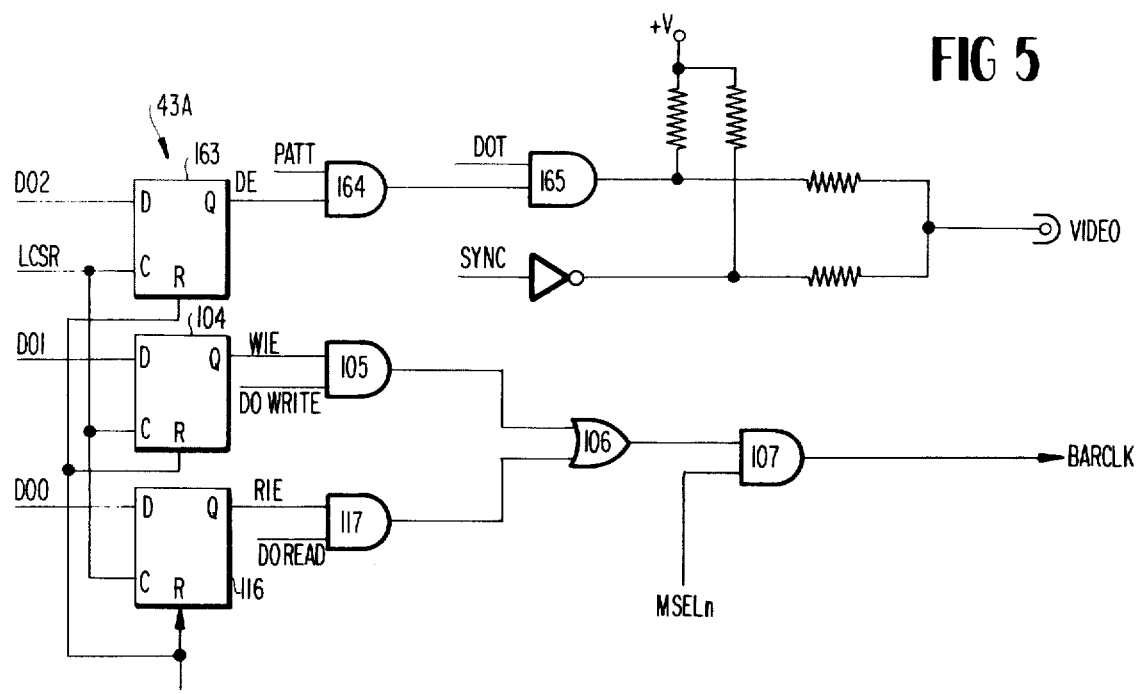
FIG. 5 is a detailed schematic diagram of a binary-to-video converter that is useful in the composition station shown in FIG. 2.

Now referring to FIG. 5, prior to any data transfers involving the display memories, the CSR register (i.e., the command register 43A) is loaded with a signal to determine whether successive addresses will be generated automatically. For example, if the second bit position (i.e., the DO1 bit position) is a ONE, then the LCSR signal clocks a flip-flop 104 to a set condition. Each DOWRITE signal from the AND gate 94 in FIG. 3 energizes an AND gate 105 and an OR gate 106. An AND gate 107, enabled by the MSELn signal that corresponds to the identified display driving circuit, transmits the BARCLK signal that advances the bus address counter 30A to identify a next storage location. Thus, the central processor and control unit 10 can write a series of data words into successive locations in the corresponding display memory without the need to effect the transfers of a memory address for each data transfer. If the flip-flop 104 is cleared when the command register is loaded, the unit 10 must issue a new address to the register 30A for use during each transfer.

Refresh Reading Mode

In order to continuously refresh the display units, it is necessary to transfer data words from all display memories to their corresponding display units. The retrieval of a word from each display memory is initiated by a FETCH signal and the storage location is identified by the contents of a display address counter (i.e., the counter 35A in FIG. 2). Each FETCH signal energizes the OR gate 85 in FIG. 3 and produces the corresponding SAMP pulse. During a read refresh operation, however, the AND gate 84 is not energized so the flip-flop 81 is cleared and the OR gate network 70 transmits all the MSELn signals. Thus, the DOMSYN signal from the flip-flop 87 in FIG. 3 energizes the AND gates in each display driving unit corresponding to AND gate 101 in FIG. 4 to generate the MMSYN signal internally for retrieving the data from the location identified by the display address counter 35A. Once the data is available at the data port, each display memory generates its MSSYNC signal. As the BUS ACTIVE signal is not asserted, an inverter 109 in FIG. 3 enables an AND gate 110. However, all the SSYN signals from each display memory must be asserted before the AND gate 110 is energized. When it is, the AND gate 110 triggers a one-shot monostable multivibrator 111 that generates a STROBE pulse. The STROBE pulse clocks and clears the flip-flop 87 to terminate the DOMSYN signal and also operates as the CLK1 pulse. The leading edge of the STROBE pulse retrieves the data from the display memories, while the trailing edge of the CLK1 pulse loads the data into the first buffer (i.e., buffer 37A) in each display driving unit. The data path from the display memory is established because all the AND gates corresponding to the AND gate 97 in FIG. 4 are de-energized during such an operation so the D→M and related signals are not asserted. Also, AND gates 108 and 112 in FIG. 3 are de-energized. Thus, AND and OR gates associated with each display unit and corresponding to AND gates 113 and 114 and OR gate 115 remain de-energized so the D→BSEL and D→B signals that control the multiplexers and transceivers are inactive.

Reading Mode

In order to retrieve data from the display memory or to retrieve the contents of the bus address counter 30A, a reading operation is initiated by the central processor unit 15. Typically such an operation for retrieving data begins by writing an initial address into the bus address counter 30A. Also bit DOO, the first data bit, is written to set a flip-flop 116 in FIG. 5. This flip-flop 116 and an AND gate 117 are analogous to the flip-flop 104 and AND gate 105 because they control whether the bus address counter 30A will be allowed to increment during each reading operation.

If the next reading operation initiated by the central processor unit 15 identifies the bus address counter 30A, the decoder 72 in FIG. 3 transmits the REG signal so the AND gate 74 is energized. In this case the AND gate 112 is energized by the READ signal from an inverter 113, as the C1 signal is not asserted, and by the A2 signal. The A2 signal is one address signal that is coupled to the decoders 67 and 71. As a result, the AND gate 112 transmits a BAC→B signal that is coterminous with the MSYN signal, so the AND gate 114 in FIG. 4 transmits a D→BSEL signal that conditions the bus data multiplexer 42A to couple signals from the bus address counter 30A to the input of the data transceiver 27A. Simultaneously, the OR gate 115 is energized so the D→B signal enables the data transceiver 27A to couple the signals from the bus data multiplexer 42A to the data conductors in the bus 25.

In order to read data from the display memory, the central processor unit 15 transmits address signals that identify the fictitious data buffer register so the decoder 72 in FIG. 3 transmits the MEM signal and enables the monostable multivibrator 86 and flip-flop 87 to generate the SAMP and DOMSYN signals. In addition the AND gate 108 issues a DOREAD signal. The MSELn, DO-READ, BUS ACTIVE and DOMSYN signals energize the AND gates 113, 100 and 101 in FIG. 4 thereby to establish the data paths that are required to effect the data transfer from the data port 34A in FIG. 2. The BUS ACTIVE and $\overline{\text{SSYN}}$ signals then energize the AND gate 103 in FIG. 3 so it transmits the BSSYN signal that indicates, during a reading operation, that the data is available at the bus 25.

Still referring to FIG. 3, if the AC power voltage should fall below a predetermined value, an ACLO signal appears on a corresponding control conductor in the bus 25. An ACLO buffer circuit 120 produces a PWRLO signal that clears the flip-flop 81 thereby terminating the BUS and BUS ACTIVE signals so that no invalid data is transferred. Such a termination of the BUS signal causes circuitry including an AND gate 121 and inverter 122 to reset the flip-flop 87 and terminate the DOMSYN signal. The appearance of an INIT signal on the bus 25 resets the entire circuit.

Timing and Control

Figure 6:
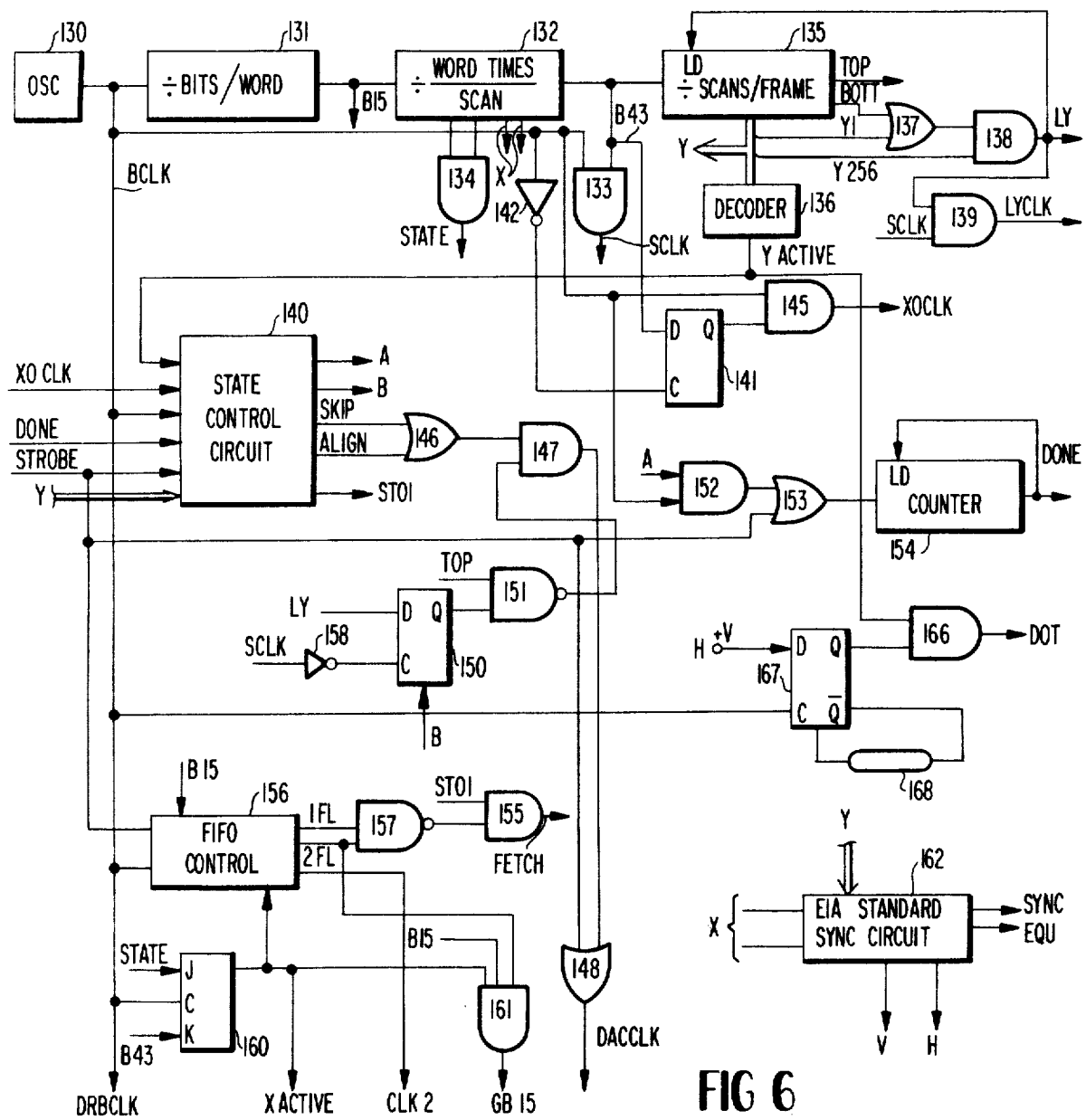

The circuitry shown in FIG. 6 controls the timing of all the displays and, with circuitry in FIG. 5, properly synchronizes the video display with the transmission of the data from the display memory. An oscillator 130 in FIG. 6 transmits BCLK pulses at the bit rate that is calculated by multiplying together the numbers of frames per second, of scan intervals per frame, of word intervals per scan and of bits per computer word. Assuming 30 frames per second, 515 scan lines per frame, 44 word times per scan and 16 bits per computer word, the oscillator 130 operates at 10.8768 MH.

The BCLK pulses from the oscillator pass through a buffer circuit (not shown) to produce the DRBCLK pulses that shift the data in serial form from the parallel-to-serial converter in a display driving circuit to the corresponding binary-to-video converter. As shown in FIG. 2, these DRBCLK pulses control the shift of data from the parallel-to-serial converter 41A to the binary-to-video converter 23A.

The output of the oscillator 130 also energizes a divider 131 that produces a B15 signal each time a computer word is transmitted. In this specific embodiment the divider 131 is a counter with a modulus of 16.

Each time a computer word interval is completed, the B15 output signal from the counter 131 increments another counter 132. When the number of word intervals that correspond to a single scan interval have been received, the counter 132 produces a B43 signal. In this specific embodiment the scan interval corresponds to 44 computer word intervals and the divider 132 is a counter with a modulus of 44. When the B43 signal is active during the 44th interval, an AND gate 133 generates an SCLK pulse that is coterminous with each BCLK pulse thereby to indicate the end of a scan line. Another AND gate 134 responds during an earlier state of the counter 132 to transmit a STATE signal; in this particular embodiment, the STATE signal is generated after the counter 132 contains a count of "10". This represents a delay which corresponds to various horizontal retrace and other delay functions.

Each time a scan is completed, the counter 132 increments another counter 135 that has a modulus corresponding to the number of scans per frame; in this particular embodiment, 515. The most significant, or last, stage in the counter 135 generates TOP and BOTT signals that correspond to the two sets of scan operations that occur in an interlaced display. The counter 135 also produces a Y1 signal during the interval of a second scan line and a Y256 signal during a 257th scan line, assuming a Y0 signal corresponds to the first scan line interval. A decoder 136 decodes the output signals from the counter 135 and transmits a YACTIVE signal during the first 216 scan intervals that correspond to active scanning; the remaining scan intervals are used to perform vertical retracing operations.

An OR gate 137 and an AND gate 138 monitor the values of the counter 135 to produce a counter having a modulus of 258 while the TOP signal is active and a modulus of 257 when the BOTT signal is active. The occurrence of either condition produces an LY signal that resets the counter 135 to ZERO. Thus, during an interlaced display in which there are 515 lines of active display on the screen, the values Y1 through Y256 correspond to the odd numbered scan lines (e.g. lines 1, 3, 5 ... 515) while the TOP signal is active and correspond to the even numbered lines (i.e., lines 0, 2, 4 ... 514) when the BOTT signal is active. Each time the AND gate 138 transmits the LY signal, the next SCLK pulse passes through an AND gate 139 thereby to generate the LYCLK pulse that loads the contents of the begin display register 36A into the display address counter 35A. This operation establishes an initial correspondence between the then addressed location on each display memory and the first display position on the screen (i.e., the upper left corner).

With this understanding of the timing signals that are generated, it is possible to refer to a state control circuit 140. This circuit produces state signals according to a state diagram shown in FIG. 6A. So long as the YACTIVE signal from the decoder 136 is not asserted, the state control circuit 140 remains in a REST state during which the A and B signals are not asserted. When the rest interval ends (i.e., the YACTIVE signal is asserted), the B43 signal conditions a flip-flop 141 so it is set by an inverted BCLK pulse from an inverter 142. The flip-flop 141 enables an AND gate 145 to transmit XOCLK pulses simultaneously with successive BCLK pulses while the B43 signal is active. Thus, the first XOCLK pulse causes the state control circuit 140 to shift to a SKIP state during which the A signal is asserted while the B signal is not asserted. During the SKIP state, an OR gate 146 provides an enabling input to an AND gate 147. The AND gate 147 normally is enabled by a circuitry including a flip-flop 150 and a NAND gate 151. Thus, during the SKIP state, successive BCLK pulses energize the AND gate 147 and an OR gate 148 to generate DACCLK pulses that advance the display address counter 35A in the display driving circuit 22A. In the SKIP state, however, no information is obtained from the display memory so the system effectively skips over the data corresponding to the scan line that will be interlaced during the next field.

Figure 6A:
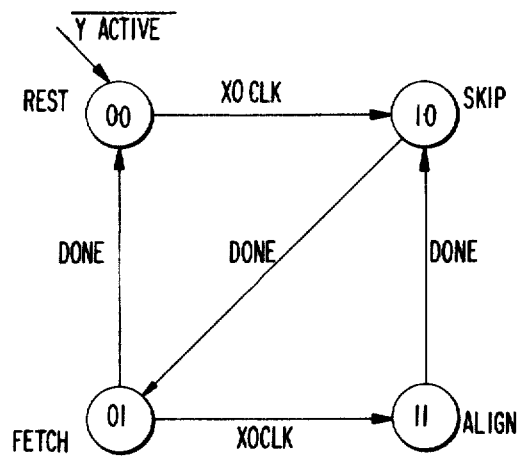
FIG. 6A is a state diagram that illustrates the sequence of operations performed by state control circuitry in FIG. 6.

So long as the A signal is asserted, the BCLK pulses also energize an AND gate 152 and OR gate 153 thereby to increment a counter 154. Although the counter 132 defines 44 intervals, only 36 of those intervals are involved with an active display. The remaining intervals are used for horizontal retracing operations. Thus, the counter 154 produces a DONE signal upon the completion of the number of computer word intervals that produce an active display (i.e., in this specific embodiment the counter 154 has a modulus of 36). As shown, the DONE signal presets the counter 154 to an initial state and is an input signal to the state control circuit 140. As shown in FIG. 6A the assertion of the DONE signal causes the A and B signals to become complemented (i.e., the A signal is not asserted while the B signal is asserted) thereby establishing a FETCH state. Encoding circuitry in the state control circuit 140 produces a ST01 signal during this state that energizes an AND gate 155 normally enabled by a FIFO control 156 and a NAND gate 157. This FETCH signal is coupled back to the OR gate 85 shown in FIG. 3 and thereby requests the next memory cycle to retrieve the contents of a next location from the display memory to refresh the corresponding display. Normally the FETCH signal will be asserted. If however, both buffers are full, the NAND gate 157 disables the AND gate 155 to terminate the FETCH signal.

Thus, it will be apparent that while the device address counter 34A increments to identify successive locations in the display memory, the state control circuit 140 alternately produces FETCH and SKIP states thereby alternately to utilize and skip blocks of successive locations that correspond to 36 computer-word intervals that occur during each successive scan.

The alternate sequence of the SKIP and FETCH states exists with one exception. When the TOP signal is active and the counter 135 reaches the state 257, it should be followed by immediately shifting the BOTT signal to an asserted level and fetching the corresponding data that is in the next successive block of display memory locations. Each time the LY signal from the AND gate 138 is asserted, the trailing edge of an SCLK pulse from the AND gate 133 is coupled through an inverter 158 to set the flip-flop 150. If the TOP signal is active, the NAND gate 151 disables the AND gate 147 and thereby precludes the transmission of DACCLK pulses during the following SKIP state. However, the flip-flop 150 stays cleared because the B signal from the state control unit 140 acts as an overriding resetting signal when it is asserted. When the counter 154 transmits the DONE signal, the state control circuit 140 shifts back to the REST state until an XOCLK signal is again asserted.

Now referring to the FIFO control 156, a NAND gate 157 and the first and second buffers 37A and 40A in FIG. 2 constitute a two stage, "first-in/first out" (FIFO) memory. The operations of these memories are well known in the art. The FIFO control 156 and other associated circuitry respond to the STROBE signal, the BCLK pulses and the B15 signal from the counter 131 to transfer data through the first buffer 37A, the second buffer 40A to the converter 41A. The FIFO control 156 generates a 1FL signal when there is valid data in the first buffer 37A and a 2FL signal when there is valid data in the second buffer 40A. The NAND gate 157 disables the AND gate 155 thereby to prevent the circuitry from requesting another word from the display memory 26A if both the 1FL and 2FL signals are asserted.

As previously indicated, the AND gate 134 generates a STATE signal after the counter 132 receives five B15 clocking pulses. When the STATE signal is asserted, a BCLK pulse sets the flip-flop 160 thereby to provide one enabling signal to an AND gate 161. If the second buffer 40A is full, the 2FL signal from the FIFO control also enables the AND gate 161 so that subsequent B15 signal from the counter 131 energizes the AND gate 161. The resulting GB15 pulse loads the data stored in the second buffer 40A into the parallel-to-serial converter 41A. As soon as the second buffer 40A is empty, the FIFO control 156 terminates the 2FL signal and, if the 1FL signal is active, generates the CLK2 pulse to transfer the data in the first buffer 37A to the second buffer 40A. In this manner the data supplied from the data port 34A in the display memory 26A is shifted to the binary-to-video converter 23A in the proper sequence. Moreover, as previously indicated, these various timing signals are received in synchronism by all the display driving circuits 22A so the same operation occurs in all the remaining display driving circuits 22A. This operation continues until the counter generates a DONE signal whereupon the state control unit 140 shifts to the REST state as shown in FIG. 6A.

In addition, FIG. 6 shows an EIA standard SYNC circuit 162 that generates signals for controlling the horizontal synchronizing, vertical synchronizing and equalization pulses for defined synchronizing and equalizing operations, respectively. This circuit derives its necessary information from the counter 135 and from predetermined ("X") signals from the counter 132. The operation of this circuit conforms to EIA standards. Many such circuits are known, so no further discussion of this circuit is necessary.

Also, FIG. 6A depicts a state change to an ALIGN state if an XOCLK pulse is generated during the FETCH state. This is an error condition, so it merely is included to complete the function of the state control unit 140.

As shown in FIG. 5, the VIDEO signal is responsive to either the SYNC pulses from the circuit 162 in FIG. 6 or PATT video signals from the parallel-to-serial converters, such as the converter 41A in FIG. 2. When the command register 43A stores a display enable command, a flip-flip 163 sets and enables an AND gate 164 to pass the PATT signals to an AND gate 165 to be synchronized with DOT pulses that are generated by an AND gate 166 in FIG. 6. More specifically, the YACTIVE signal from the decoder 136 enables the AND gate 166. The BCLK pulses from the oscillator 130 in FIG. 6 trigger a pulse generator, comprising a flip-flop 167 and a delay circuit 168 to produce a pulse that passes through the AND gate 166 as a DOT pulse.

In operation, an item initially is processed in response to a program by the central processor unit 15 in FIG. 1 to convert the text to be composed into binary information necessary to display the item as a unit in its proposed form at the composition station. This information then is stored in a direct access memory unit in a block of locations that correspond to a matrix that overlies the screen matrix.

Assuming that the item is to be displayed at the upper left corner of the screen, the processor and control unit 10 shifts a ZERO into the begin display register and effects a transfer of data into the display memory. When the memory is "filled", it normally will contain the information to be displayed in locations that correspond to the desired column width. Thus, if the column is to be 9 computer words wide (i.e., 25% of the screen width), only the locations corresponding to that column width contain data. The remaining locations are empty. For example, memory locations 0–8, 36–44, 72–80, etc. contain information. Locations 9–35, 45–71, etc. contain blanks.

Assuming the operator wishes to move the column horizontally, the contents of the begin display register are altered by a number that is less than the number of words that are retrieved by a single line (i.e., by a number less than 36). This alters the initial correspondence between the storage locations and the reference display position. For example, if the begin display register were incremented by "2", the display would shift to the right by 1/16th of the display width (i.e., 0.5 inches for an 8 inch display width). Such translational motion is initiated by a command from a text editing keyboard that calls up a horizontal shift routine. This routine alters the contents of the begin display register to produce the shift. Such a shift, however, causes part of the information to produce a display at the opposite end of the scan line but displaced by one scan line. In order to avoid such an erroneous display, the central processor modifies the data received from the direct address memory by substituting zeroes. Thus, a column on the screen can be shifted horizontally across the screen and even off one side of the screen without reappearing at the other side of the screen.

When the operator initiates a vertical scrolling operation, the processor and control unit alters the correspondence between the storage locations and the reference display position by changing the contents of the begin display register by a number that is a multiple of the number of word intervals per scan (i.e., a multiple of 36 in the specifically displaced embodiment). Each such multiple produces a displacement of one scan line. If the display memory corresponds exactly to the visual display area, the new data must constantly be substituted for the data that is lost. On the other hand, if the memory contains an excess number of storage locations, data transfers to the memory can be delayed somewhat so long as the buffer, or added, memory locations are not depleted during the scrolling operation. Continuous scrolling eventually causes the displayed information to shift vertically and off the screen.

In summary, the circuitry that has been disclosed provides an extremely flexible graphics display that is especially suited for composition purposes. The specific embodiment shown in FIG. 2 maximizes the utilization of the circuitry by slaving a number of display driving circuits to a single timing and control unit. Moreover, the time requirements on the bus 25 are minimized during refreshing operations because data is transferred directly from the display memories to the corresponding display units. The interconnection of display driving circuits and display units is quite flexible and this system enables an item to be positioned easily. The central processor need only change the data stored in the begin display register to change the position of the image. If two display driving circuits connect through a logical combination means to a single binary-to-video converter, then the images from each can be positioned independently of each other. Moreover, the system is also adapted for operation with display units that have multiple guns for producing a display in color if each gun is associated with a display driver circuit that receives data corresponding to the corresponding color data. Also, the operation of this display is not limited to use as a composition machine or in conjunction with text editing systems, such as those shown in FIG. 1. It can be used as an output device for any system that can utilize a page matrix for displaying graphical information. Therefore, it is the object of the appended claims to cover all such variations and modifications as come within the true spirit and scope of this invention.

What I claim as new and desire to secure by Letters Patent is:

1. A graphics display unit for providing a visual image that corresponds to input data, said graphics display comprising:
   A. matrix display means have a plurality of energizable display positions at intersections on a matrix including a reference display position, individual display positions being selected for energization in a predetermined sequence.
   B. memory means connected to said matrix display means, said memory means having a plurality of addressable storage locations for storing binary information that corresponds to the image to be displayed and that defines the energization level for each said display position of said matrix display means, said memory means storing the input data in a portion of said addressable storage locations;
   C. addressing means connected to said memory means for generating storage location addresses for all said storage locations in said memory means in an addressing sequence;
   D. initial address means connected to said addressing means for storing an initial address that establishes an initial correspondence between one of said storage locations and said reference display position;
   E. altering means connected to said initial address means for altering said initial correspondence between said one addressable storage location and said reference display position by changing the initial address thereby to generate a new initial correspondence and relocate the image on said display means; and
   F. timing and control means connected to said addressing means and said matrix display means for maintaining a relative correspondence between the addressing of successive storage locations and the selection of successive display positions by synchronizing the predetermined sequence and the addressing sequence based upon the initial correspondence.

2. A graphics display unit as recited in claim 1 wherein said display means is energized in an iterative fashion to produce a persistent image and wherein said addressing means includes a counter means and said initial address means comprises a register for storing the initial address, and wherein said timing and control means includes:
   i. means for changing said counter means in said addressing means thereby to address successive locations in said memory means; and
   ii. means for transferring the contents of said register to said counter means each time said display means is conditioned to energize the reference display position.

3. A graphics display unit as recited in claim 2 wherein said altering means comprises means for changing the contents of said register.

4. A graphics display unit as recited in claim 2 that connects to external means that effect data transfers with said graphics display unit by generating transfer signals, said timing and control means additionally including:
   iii. means for generating first request signals periodically thereby to retrieve from said memory means information for said display means,
   iv. means responsive to the transfer signals from the external source for generating second request signals for transferring information between said graphics display unit and the external source, and
   v. arbitration means responsive to the first and second request signals for enabling said graphics display units to respond to only one of the request signals.

5. A graphics display unit as recited in claim 4 additionally comprising means for transferring information between the external source and said memory means and wherein:
   B. said memory means includes:
      i. first data path means between said memory means and said display means,
      ii. second data path means between said memory means and the external source, and
   C. said addressing means includes:
      iii. first address path means between said counter means and said memory means, and iv. second address path means between said memory means and the external source, and F. said timing and control means includes means responsive to said arbitration means for selecting one said first and second data path means and a corresponding one of said first and second address path means.

6. A graphics display unit as recited in claim 5 wherein said second address path means includes:
   a. a counter for receiving information corresponding to the address of a storage location in said memory means, and
   b. means for enabling said counter to be altered to address a successive storage locations in response to each transfer of information between the external source and said memory means.

7. A graphics display unit as recited in claim 1 wherein said display means comprises a predetermined number of display positions, each said storage location in said memory means storing a number of binary digits that are transferred in a parallel format and said memory means includes a data path means in circuit with said display means, said data path means including parallel-to-serial conversion means, and
   F. said timing and control means includes:
      i. means for transferring data in parallel from said memory means to said parallel-to-serial conversion means, and
      ii. means for transferring data from said parallel-to-serial conversion means to said display means in serial form.

8. A graphics display for providing a visual image that corresponds to input data, said graphics display comprising:
   A. matrix display means having a plurality of energizable display positions at intersections on a matrix including a reference display position, the individual display positions being selected in a predetermined sequence.
   B. a plurality of memory means, each said memory means having a plurality of addressable storage locations for storing binary information that corresponds to the image to be displayed and that defines the energization level for each said display position of said matrix means, each said memory means storing the input data in a portion of its said addressable storage locations;
   C. logical combination means for conveying logically combined information from locations in each said memory means to said display means to control the energization of each said display position;
   D. addressing means connected to each said memory means, each said addressing means generating storage location addresses for all said storage locations in said memory means connected thereto in an addressing sequence,
   E. initial address means connected to a first of said addressing means for storing an initial address that establishes an initial correspondence between one of said storage locations in said corresponding memory means connected to said addressing means and said reference display position, and
   F. altering means connected to initial address means for altering said correspondence between said one storage location and said reference display position by changing the address thereby to generate a new initial correspondence and relocate on said display means the visual image representing the input data in said memory means; and
   G. timing and control means connected to said each addressing means and said matrix display means for maintaining a separate relative correspondence between the addressing of successive storage locations in each said memory means and the selection of successive display positions by synchronizing the predetermined display sequence and each of the addressing sequences based upon the initial correspondences.

9. A graphics display unit as recited in claim 8 wherein said display means is energized in an iterative fashion to produce a persistent image and each said addressing means includes a counter means and said initial address means comprises a register, and wherein: said timing and control means includes:
   i. means for clocking said counter means in said addressing means thereby to address successive locations in each said corresponding memory means, and
   ii. means for transferring the contents of said register to said counter means in said corresponding addressing means each time said display means is conditioned to energize said reference display position.

10. A graphics display unit as recited in claim 9 wherein said altering means comprises means for changing the contents of said register.

11. A graphics display unit as recited in claim 9 that connects to external means for transferring data to said graphics display unit, said timing and control means additionally including:
   iii. means for generating first request signals periodically thereby to retrieve from a said memory means information for said display means,
   iv. means responsive to signals from the external source for generating second request signals thereby to transfer information between said graphics display unit and the external source, and
   v. arbitration means responsive to the first and second request signals for enabling said addressing means to respond to one of the request signals.

12. A graphics display unit as recited in claim 11 additionally comprising means for transferring information between the external source and each said memory means and wherein:
   B. each said memory means includes:
      i. first data path means between said memory means and said logical combination means, and
      ii. second data path means between said memory means and the external source,
   D. each said addressing means includes:
      iii. first address path means between said counter means and said memory means, and
      iv. second address path means between said memory means and the external source, and
   G. said timing and control means includes:
      vi. means responsive to said arbitration means for selecting one of said first and second data path means and corresponding one of the first and second address path means associated with each said memory means.

13. A graphics display unit as recited in claim 12 wherein said second address path means includes:
   a. a counter for receiving information corresponding to the address of a storage location in said corresponding memory means, b. means for enabling said counter to be altered to address a successive storage location in response to each transfer of information between the external source and said corresponding memory means.

14. A graphics display unit as recited in claim 8 wherein said display means comprises a predetermined number of display positions, each said storage location in each said memory means storing a number of binary digits that are transferred in a parallel format and wherein B. each said memory means includes:
  i. data path means in circuit between said logical combination means and said corresponding memory means, said data path means including parallel-to-serial conversion means, and
G. said timing and control means includes:
  i. means for transferring data in parallel from each said memory means to said corresponding parallel-to-serial conversion means, and
  ii. means for transferring data in series from said corresponding parallel-to-serial conversion means to said logical combination means in serial form.

15. A graphics display unit as recited in claim 14 wherein said logical combination means comprises OR gate means for combining the signals from said parallel-to-serial conversion means in a logical OR combination.

* * * * *